United States Patent
Tryon et al.

(10) Patent No.: US 11,185,026 B2
(45) Date of Patent: Nov. 30, 2021

(54) VERTICAL HYDROPONIC FARMING SYSTEM

(71) Applicant: SourceAmerica, Vienna, VA (US)

(72) Inventors: Daniel Tryon, Oswego, NY (US); Casmir Usiatynski, Oswego, NY (US)

(*) Notice: Subject to any disclaimer, the term of this patent is extended or adjusted under 35 U.S.C. 154(b) by 185 days.

(21) Appl. No.: 16/185,444

(22) Filed: Nov. 9, 2018

(65) Prior Publication Data
US 2020/0068821 A1     Mar. 5, 2020

Related U.S. Application Data (60) Provisional application No. 62/726,767, filed on Sep. 4, 2018.

(51) Int. Cl.
| | | |
|---|---|---|
| *A01G 31/04* | (2006.01) | |
| *A01G 27/00* | (2006.01) | |
| *A01G 31/00* | (2018.01) | |

(52) U.S. Cl.
CPC ......... *A01G 31/042* (2013.01); *A01G 27/001* (2013.01); *A01G 2031/006* (2013.01)

(58) Field of Classification Search
USPC .................... 47/59 R–63, 17, 67, 79, 82, 83; 198/465.3, 466.1, 799, 803.2
See application file for complete search history.

(56) References Cited

U.S. PATENT DOCUMENTS

| | | | | |
|---|---|---|---|---|
| 3,432,965 A | * | 3/1969 | Smith | A01G 31/045 47/60 |
| 3,909,978 A | * | 10/1975 | Fleming | A01G 31/042 47/82 |
| 4,068,405 A | * | 1/1978 | Campbell | A01G 31/045 47/65 |
| 4,255,897 A | * | 3/1981 | Ruthner | A01G 9/249 47/65 |
| 4,547,992 A | * | 10/1985 | Wingerden | A01G 9/143 47/17 |
| 10,112,814 B1 | * | 10/2018 | Shelor | A01G 31/042 |
| 2004/0111965 A1 | * | 6/2004 | Agius | A01G 31/042 47/62 R |

(Continued)

OTHER PUBLICATIONS

SourceAmerica, Screen Shots from "Indoor Vertical Farming Concept Model" video, <<https://www.youtube.com/watch?v=Fi4_3PTi_Tk&feature=youtu.be>>, published Aug. 25, 2017, pp. 1-6.

*Primary Examiner* — Andrea M Valenti (57) ABSTRACT

A system for vertical hydroponic plant growing. The system, and associated apparatuses and methods, may include or use sprockets, a sprocket drive device that is connected to at least one sprocket among the sprockets, a first continuous loop chain that is mounted on the sprockets, a second continuous loop chain that is mounted on the sprockets, and trays. Each tray includes a first end and a second end that includes a drain hole. The trays are attached to the first continuous loop chain and to the second continuous loop chain. The system also includes a fluid-dispensing device that is configured to dispense a fluid into a tray that is moved by the chains to a position adjacent to the fluid-dispensing device. The chains are configured to longitudinally tilt a tray downward towards the drain hole while the tray is near the position adjacent to the fluid-dispensing device.

20 Claims, 7 Drawing Sheets

(56) References Cited

U.S. PATENT DOCUMENTS

| | | | |
|---|---|---|---|
| 2012/0279122 A1* | 11/2012 | Benne | A01G 31/042 47/60 |
| 2013/0255145 A1* | 10/2013 | Wiggins | A01G 9/20 47/17 |
| 2013/0305601 A1* | 11/2013 | Park | A01G 9/14 47/17 |
| 2015/0040478 A1* | 2/2015 | Moghaddam | A01G 31/042 47/62 R |
| 2015/0305260 A1* | 10/2015 | Ng | A01G 31/06 47/62 R |
| 2016/0106048 A1* | 4/2016 | Moghaddam | A01G 31/042 47/62 R |
| 2016/0302369 A1* | 10/2016 | Pickell | A01G 31/042 |
| 2017/0118922 A1* | 5/2017 | Sherertz | A01G 31/042 |
| 2019/0141921 A1* | 5/2019 | Tempany | A01G 31/042 47/62 R |
| 2019/0335681 A1* | 11/2019 | Oberthier | B65G 23/24 |

\* cited by examiner

VERTICAL HYDROPONIC FARMING SYSTEM

CROSS REFERENCE TO RELATED APPLICATIONS

This application claims the benefit of and priority to U.S. Provisional Application No. 62/726,767 filed 4 Sep. 2018, which is hereby incorporated by reference in its entirety.

FIELD OF THE INVENTION

This invention relates to a hydroponic farming system that utilizes vertical space and moves the plant-growing trays to an accessible work area, and more particularly in various embodiments, to a vertical hydroponic farming system with accommodations for people with disabilities.

BACKGROUND

The participation rates of people with disabilities within farming and the agriculture industry is extremely low. This is in significant part due to the difficulty of physically accessing the plants and farming equipment and materials. For example, most production agriculture spreads out over very large areas, typically outdoors on uneven terrain, and in constantly changing environments (due to weather conditions), which makes it difficult for workers, and especially people with physical and mental disabilities, to travel to the location of each plant and piece of farming equipment and to work after arriving. Similarly, conventional indoor agricultural facilities (e.g., greenhouse and hydroponic facilities), contain multiple rows of tables with soil or hydroponic trays, which are accessed by aisles spread out over hundreds or thousands of square feet, which makes it very difficult for people with physical and mental disabilities to travel to the location of each plant and piece of equipment and to work.

In addition, conventional indoor agricultural facilities do not make use of available vertical space, which is inefficient and adds cost. Moreover, the few conventional indoor agricultural facilities that utilize vertical space by stacking hydroponic or dirt tray tables vertically, e.g., on platforms, catwalks, or staging, are even more difficult for people with physical and mental disabilities to access because they require vertical movements, e.g., climbing stairs or ladders or the like, in addition to large horizontal movements, in order to travel to the location of each plant or piece of equipment. Moreover, there is larger falling danger when disabled people are positioned on tall vertical platforms, catwalks, or the like.

Accordingly, it is desirable to develop improved devices, systems, methods, and techniques for farming which address the drawbacks and technical shortcomings of current systems and methods, in particular with respect to accessibility by and accommodations for people with disabilities, and which improve the utilization of vertical space.

SUMMARY

Disclosed are systems, apparatuses and methods for vertical hydroponic plant growing. In various implementations, the systems, apparatuses and methods may include or use a plurality of sprockets, a sprocket drive device that is connected to at least one sprocket of the plurality of sprockets, a first continuous loop chain that is mounted on the plurality of sprockets, a second continuous loop chain that is mounted on the plurality of sprockets, and a plurality of trays. Each tray of the plurality of trays includes a first end and a second end that includes a drain hole. The plurality of trays are attached to the first continuous loop chain and to the second continuous loop chain. The system also includes a fluid-dispensing device that is configured to dispense a fluid into a tray among the plurality of trays that is moved by the first continuous loop chain and the second continuous loop chain to a position adjacent to the fluid-dispensing device. The second continuous loop chain is configured to longitudinally tilt the tray downward towards the drain hole while the tray is near the position adjacent to the fluid-dispensing device.

In some variants or embodiments, the first continuous loop chain is configured to longitudinally tilt the tray downward towards the drain hole while the tray is near the position adjacent to the fluid-dispensing device.

In some variants or embodiments, the system also includes a plant-growing light that is mounted between the first continuous loop chain and the second continuous loop chain. In some variants or embodiments, the system also includes a sensor that is configured to detect that a tray occupies a specific position in the system. In some variants or embodiments, the sensor is configured to detect that the tray occupies the position adjacent to the fluid-dispensing device.

In some variants or embodiments, data from the sensor is used to control the sprocket drive device. In some variants or embodiments, the plurality of sprockets are arranged such that the plurality of trays pass through a work position that is located between about 2 feet to about 4 feet in height above a floor.

In some variants or embodiments, the system also includes a sensor that is configured to detect that a tray occupies the work position. In some variants or embodiments, the system also includes a fluid-collecting device that is configured to collect the fluid that drains from the drain hole of a tray. In some variants or embodiments, the fluid-collecting device is operably connected to the fluid-dispensing device, such that the fluid that drains from the drain hole of a tray is dispensed from the fluid-collecting device. In some variants or embodiments, the system also includes a cam activator that is adjacent to the first continuous loop chain, and such that the first end of the tray further comprises at least one bump cam that contacts the cam activator and tilts the tray.

In some variants or embodiments, the system also includes a plurality of pins attached to the first continuous loop chain and to the second continuous loop chain, and the first end of each tray comprises a first hook and the second end of each tray comprises a second hook, and the plurality of trays are attached to the a first continuous loop chain and to the second continuous loop chain via the first hook and the second hook. In some variants or embodiments, the first end is configured such that the first hook is a different distance from a bottom of the tray than the second hook.

In some variants or embodiments, the system also includes a computing system, and the computing system is operably connected to the sprocket drive device and controls the sprocket drive device. In some variants or embodiments, the computing system is operably connected to the fluid-dispensing device and controls the fluid-dispensing device. In some variants or embodiments, the computing system is operably connected to the plant-growing light and controls the plant-growing light. In some variants or embodiments, the first end of each tray of the plurality of trays includes an information-containing indicia, and the sensor is configured to read data from the information-containing indicia. In some variants or embodiments, the data that is read from the information-containing indicia is used to control the system, such as controlling the sprocket drive device. In some variants or embodiments, the system may further include a cueing device, which may be wearable, that provides audible, sensory, or visual task prompting to a user of the system.

BRIEF DESCRIPTION OF THE DRAWINGS

The accompanying drawings, which are incorporated in and constitute a part of this specification, illustrate examples of embodiments of the invention and together with the description, serve to explain the principles of the invention. In the figures.

DETAILED DESCRIPTION

Reference will now be made in detail to exemplary embodiments of the invention, examples of which are illustrated in the accompanying drawings. Wherever convenient, the same reference numbers will be used throughout the drawings to refer to the same, similar, or like parts.

Various embodiments and implementations consistent with the invention include hydroponic vertical farming or plant-growing systems, which may include one or more features or accommodations that make them usable, or easier to use, by workers, and especially by people with disabilities. Some implementations may be for indoor use. Various implementations may be arranged in a wide range of configurations to maximize plants per cubic foot and take advantage of any available sized indoor space, especially vertical space. Various implementations may be self-contained and environmentally controlled to provide year-long sustainable agriculture options in colder climates.

Various implementations of the vertical hydroponic plant-growing system can provide a consistent work environment for the worker or farmer or user (e.g., a person with disabilities), bring all of the plants to the user at a work station or work location via a continuous loop chain or belt or the like, such that the user does not have to move any significant distances to access the plants, and incorporate automatic controls which allow for a wide range of accommodations for many disabilities. Thus, various implementations of the vertical hydroponic farm system can improve the agricultural employment opportunities and choices for people with disabilities.

Various implementations consistent with the invention employ LED (light emitting diode) lighting for plant growth. In northern climates, relatively little agricultural crop production takes place in the winter months due to the low levels of solar radiation. Some implementations of the vertical hydroponic farm system can utilize natural light (when and where available) and supplement it with additional system-provided artificial light, implementing a hybrid system when needed or preferred for energy efficiency. Regardless of whether they also employ natural light, artificial-light implementations can provide all of the light levels and wavelengths necessary for all stages of plant growth, which makes the system usable in any climate zone and for many different types of plants.

Various implementations can be dimensioned to a cuboid shape of almost any size, so as to fit and maximize the use of all available space, and especially vertical space, for example, inside existing underutilized buildings, such as warehouses, retail, commercial, or industrial buildings. Often, warehouses and industrial buildings have ceiling heights that reach 20 or more feet, and the system is designed to utilize this vertical space without reducing the convenience or increasing the danger to the user. Because the system brings all of the plants down to the level at which the human farmers perform the work, (e.g., waist height, seated height, or work-table height above the floor), the utilization of vertical space does not disadvantage, endanger, or inconvenience the farmers, whether they have disabilities or not. By maximizing utilization of vertical space, embodiments of the system can also advantageously maximize the number of plants in production per square foot of floor space.

Another advantage of embodiments of the vertical hydroponic farming system is to produce fresher, better tasting, healthier, locally grown produce while maintaining a year around supply. Urban settings often lack available land for agriculture. Therefore, most produce is shipped from great distances to where it is actually consumed. It is typically advantageous (e.g., less expensive) to grow more food locally. Food grown close to where it is consumed is much fresher, requires less energy to transport, employs more local people, and provides year-round employment instead of the typical seasonal opportunities in traditional farming.

Another advantage the vertical hydroponic farming system is that the system helps control the spread of soil-based pathogens and disease such as *E. coli*, and minimizes the use of pesticides, herbicides, fungicides, because there is no soil. In addition the system greatly reduces water usage compared to traditional farming.

Other advantages may be realized in embodiments wherein the system is environmentally controlled such that plant growth rates can be accelerated, which will maximize productivity output. In addition, embodiments of the system can allow plants to be harvested with the roots on, which may greatly improve the shelf life of the produce.

Figure 1:
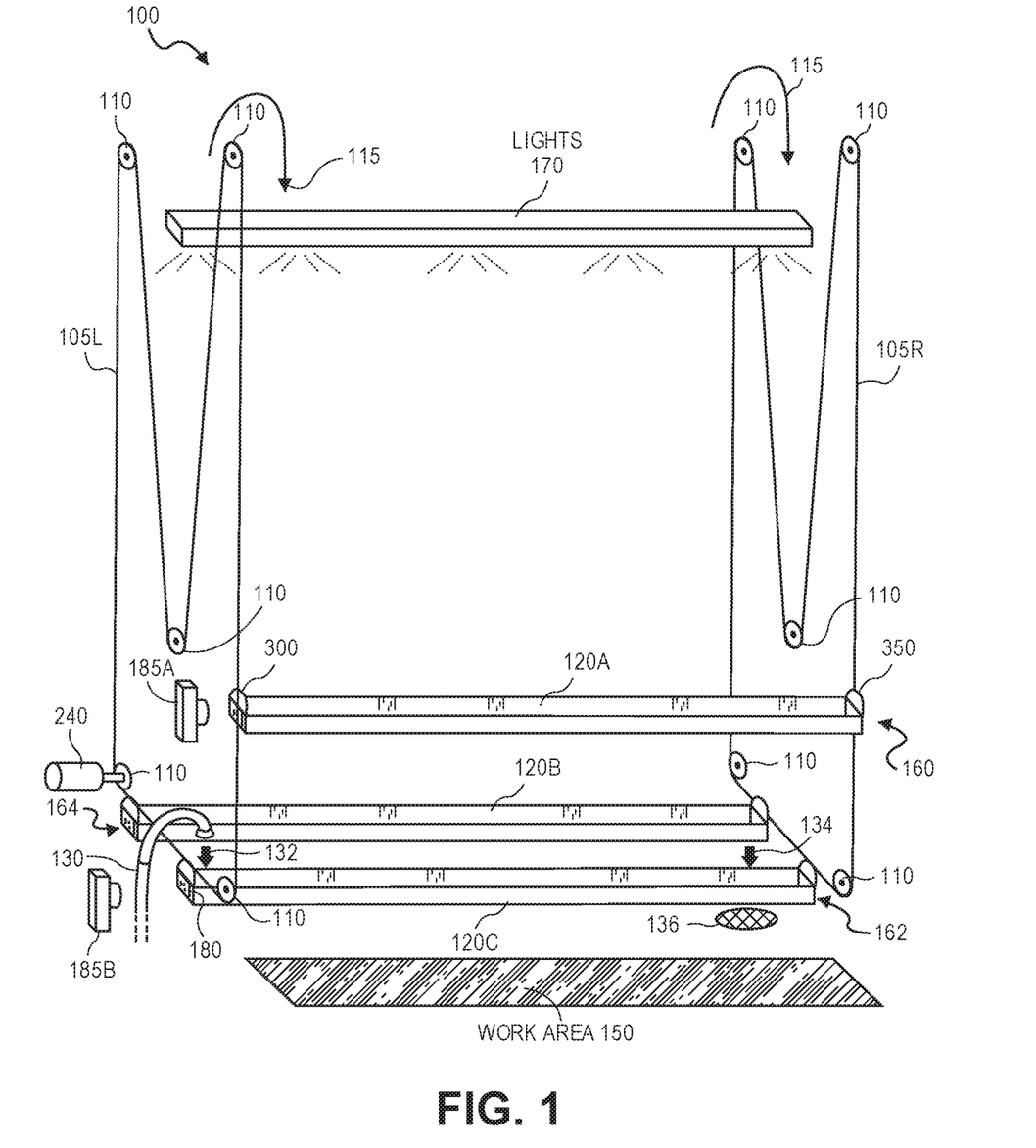
FIG. 1 shows a front perspective view of an example of the arrangement of several components in a system for vertical hydroponic farming, consistent with various embodiments of the invention.

FIG. 1 shows a front perspective view of an example of the arrangement of several components in a system 100 for vertical hydroponic plant growing, consistent with various embodiments of the invention. For clarity, visibility, and conciseness of explanation, FIG. 1 omits many structures, components and details, such as the conventional cuboid frame to which the illustrated components are attached. Generally, the frame may be a conventional metal (e.g. steel tubing, steel angle iron, etc.) and/or wooden structure to which various components, such as the sprockets, sensors, lights, guide rails, motors, etc. are operably attached. An example of a suitable frame is depicted in the related, incorporated-by-reference, provisional patent application, which is specified above.

As shown in FIG. 1, the system 100 includes two continuous loop conveyors, which in the embodiment shown are the continuous loop chains 105L (on the left of the figure) and 105R (on the right). The conveyers (e.g., chains) 105 are mounted on and guided by pulleys or sprockets 110 or the like, one or more of which may be driven or powered by a drive device 240, such as one or more electric motor or the like, which may be controlled by a computer and/or via a manual operator on/off button, or the like. The sprockets 110 may be considered as being in two groups or sets: a first set on the left side that guides the chain 105L and a second set on the right side that guides the chain 105R. In the example shown, the sprockets 110 may rotate in a direction that causes the chains 105 to move in direction 115. In other implementations, the chains 105 may move in the opposite direction or in both directions alternately as needed. As noted above, the sprockets 110 are attached to a frame (not shown). The electric motor(s) 240 may also be attached to the frame, and there may be a separate sprocket drive device 240 for each of the chains 105L and 105R; such as a second drive device (not shown in FIG. 1) connected to the sprocket 110 across from the sprocket which is attached to the sprocket drive device 240 shown in FIG. 1.

In the example shown, the chains 105 are guided into a V-shape by the sprockets 110, and plant-growing lights 170 are suspended in the middle of the V-shape as part of the system 100. As noted above, the plant-growing lights 170 may be attached to the frame (not shown). In various embodiments, other shapes may be used for the chains 105, such as a U shape, a W shape, a triple-V shape, a square-wave shape, etc., which may help to maximize the number of plants that can be accommodated within the volume of the system 100. Moreover, the possible shapes are not limited to V-type or U-type shapes. In various embodiments, there may be more than one sprocket 110 in one or more of the positions or locations shown in FIG. 1: for example, there may be two sprockets 110 or three sprockets 110 at the bottom of each V.

Figure 3A:
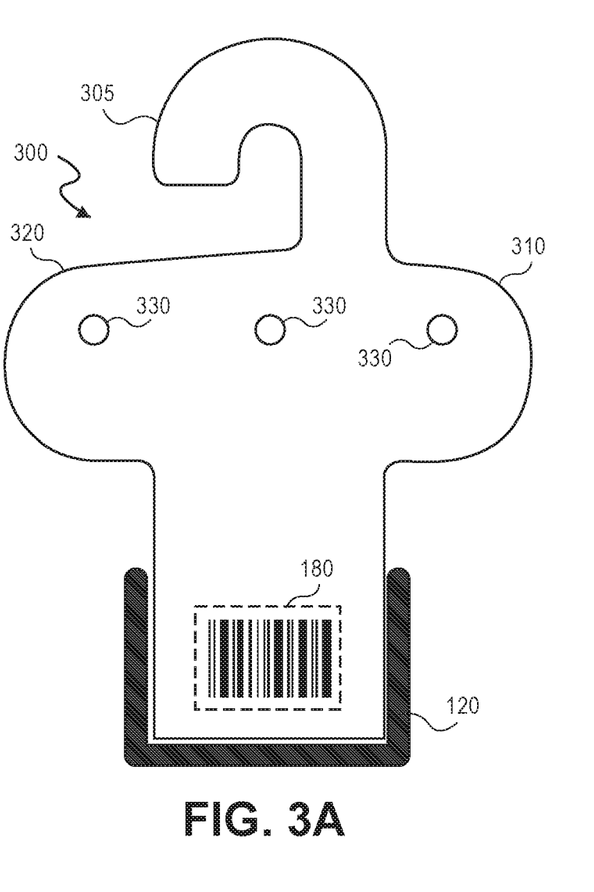
FIG. 3A depicts a left side view of a tray for hydroponic farming, consistent with various embodiments of the invention.
Figure 3B:
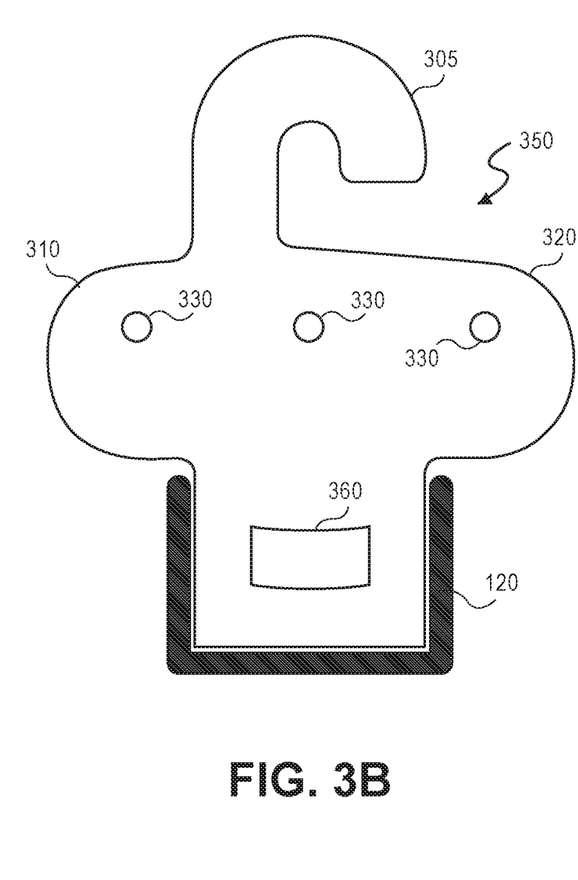
FIG. 3B depicts a right side view of a tray for hydroponic farming, consistent with various embodiments of the invention.
Figure 4:
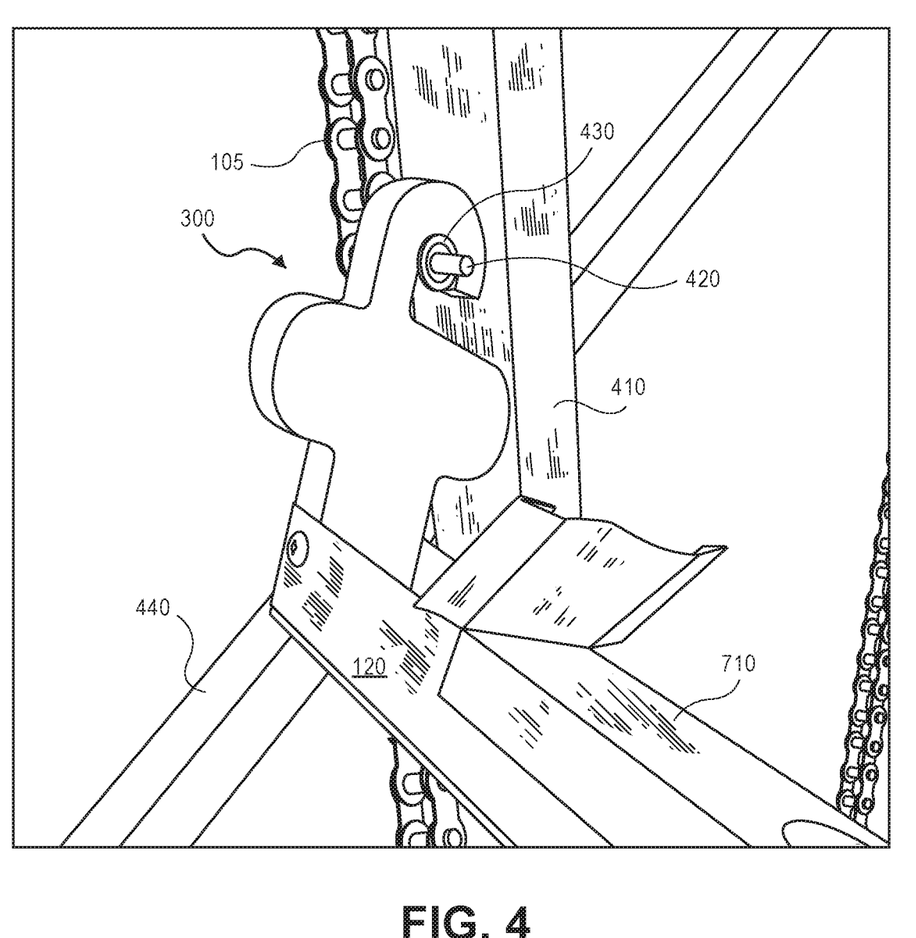
FIG. 4 shows a front perspective view of the left side of a tray while installed in a system for vertical hydroponic farming, consistent with various embodiments of the invention.

The system 100 also includes several plant-growing or hydroponic trays 120A, 120B, 120C, the ends of which are hung on or otherwise attached to the chains 105L and 105R, for example via pins or studs or the like (not shown) that protrude from the chains 105L and 105R. For clarity and ease of explanation, only three trays 120 are illustrated in FIG. 1, but one of ordinary skill will recognize that a large number of trays 120 may be attached to the chains 105L and 105R, for example, attached in a manner spaced 10-20 inches apart along the entire length of the chains 105L and 105R. The chains 105 move the trays 120 throughout the system 100 to position and expose each tray to the system's fluid dispensing (e.g., watering) and lighting, and to move or position the trays 120 for human interaction, such as planting, harvesting, etc. Although the trays 120 are generally the same length in order to attach to the two chains 105L and 105R, they may be of different depths and widths, for example, to accommodate different types of plants. In various embodiments, the trays 120 are attached in a manner that allows the trays 120 to swing, sway, and/or tilt under the influence of gravity and in some implementations under the influence of tray-tilting components (not shown in FIG. 1; see FIGS. 3A-B and 4) of the system 100. In various embodiments, the trays 120 are attached in a manner that enables the trays 120 to be detached from the chains 105L and 105R and removed from the system 100. Examples of tray-attachment components that allows the trays 120 to sway or tilt and to be detached from the chains 105 are shown in FIGS. 3A-B and 4.

For clarity and visibility of other components, plants are not shown in the trays 120 in FIG. 1 and covers are not shown on the trays 120 in FIG. 1. Examples of optional covers are shown in FIGS. 7A-D and examples with plants are shown in the above-referenced provisional application.

When the continuous loop chains 105 move in the direction 115, for example, when one or more of the sprockets 110 are rotated, the trays 120 that are attached to (e.g., hanging from) the chains 105 move into various positions in the system 100. The system 100 may be controlled by a person and/or a computer to move the chains 105 until a specific tray or trays moves into or reaches a desired position or positions, and then stop. In various embodiments, the system 100 may include one or more sensors 85 (two are shown in FIG. 1) that sense the position of one or more trays 120 and that communicate that information to the person and/or computer controlling the chains 105. In various implementations, the sensors 85 may include optical sensors (e.g., barcode readers), magnetic sensors, RFID sensors and/or mechanical sensors, and the sensors may be attached to the frame (not shown) in a manner so as to detect when a tray 120 occupies a specific position in the system 100. In the example shown in FIG. 1, tray 120A is stopped at the work position 160; tray 120B is stopped at the fluid-dispensing position 162 (e.g. nutrient solution filling station); and tray 120c is stopped at a fluid-draining position or area 164. In some implementations, the sensors 85 may also or alternatively identify the tray that occupies a given position, for example, according to a label, a barcode, an RFID tag or other information-containing indicia 180 on the tray, which differentiates each tray in the system 100.

The work position 160 is located at a convenient and accessible height and distance from a work area 150, which is where a person (e.g., a user, worker, farmer, etc., who may or may not be disabled) stands or sits while tending and working with the plants, the trays 120, and the other components of the system 100. In various embodiments, the work position 160 is between about 2 feet to about 4 feet above the floor (e.g., the floor of the work area 150), such as 2.5 feet above the floor (which is accessible for seated users) or 3.5 feet above the floor (which is accessible for standing works). In various embodiments, the system 100 may include one or more sensors 185A that are mounted at or near the work position 160, and that detect whether or not the tray 120A occupies or is in the work position 160. In some implementations, the sensor 185A at the work position 160 may trigger, signal, or otherwise directly or indirectly control the movement of the chains 105 such that they stop moving when any tray, or a specific tray 120A, is in the work position 160. In some implementations, the sensor 185A may be or include a camera, barcode reader, RFID sensor, or the like, which can read the information-containing indicia 180, such as a barcode, RFID tag, or the like, that is on the tray 120A, and so can identify a specific tray among all of the trays of the system 100.

The height of the work position 160 may be varied or changed to accommodate a standing person, a person who is sitting on a chair, a person who is sitting in a wheel chair, etc. In some embodiments, the system 100 includes a seat or chair that rolls or slides on a track or rail (not shown) that may be installed in or through the work area 150, such that a person (e.g., a physically disabled person) can easily move laterally while seated and such that the chair remains a constant distant from the tray 120A that is in the work position 160. As noted previously, from the work area 150, a person can easily access any tray 120 that is attached anywhere on the chains 105 because the system 100 transports the desired tray 120A to the work position 160. In some implementations, a workstation (not shown), such as a worktable, may be attached to the left or the right end of frame of the system 100. The workstation may be the same height as the work position 160 or may be adjustable in height. In such implementations, the above-mentioned rail supporting and guiding the chair may extend out of the work area 150 so that it reaches in front of the workstation, which allows a user to remove a tray 100 from the system 100 while seated in the chair, and then slide the chair in front of the workstation, to easily place the removed tray onto the surface of the workstation.

In the example shown in FIG. 1, the fluid-dispensing position 162 is located along the lower or bottom run of the chains 105 at or adjacent to a fluid-dispensing device 130. In the embodiment shown, the fluid-dispensing device 130, (e.g. a computer-controlled or manually controlled faucet, spigot, hose, electric pump, or the like) is configured to dispense a fluid 132 (e.g., hydroponic nutrient fluid, water, or the like) into the tray 120B that currently occupies the fluid-dispensing position 162. For example, the faucet or hose opening is positioned to that fluid pumped out of the fluid-dispensing device 130 falls or flows into the tray 120B. Similar to the sensor 185A at the work position 160, in various embodiments, the system 100 may include one or more sensors 185B that are mounted at or near the fluid-dispensing position 162, and that detect whether or not the tray 120B occupies or is in the fluid-dispensing position 162. In some implementations, the sensor 185B at the fluid-dispensing position 162 may trigger, signal, or otherwise directly or indirectly control the fluid-dispensing device 130 such that it dispenses a predetermined or calculated or human-controlled amount and/or type of fluid 132 into the tray 120B.

In the example shown, the fluid-draining position or area 164 is also located along the lower or bottom run of the chains 105. In the embodiment shown, the system 100 includes a fluid-collecting device 136, (e.g. a drain, gutter, catch basin, container, tank, pipe, or the like) that is configured to collect, direct, and/or contain the fluid 134 that flows or drains out of the tray 120C (and/or out the tray 120B) that currently occupies the fluid-draining area 164. In various embodiments, the system 100 may include sensors and devices (not shown) that detect whether or not the tray 120C is in the fluid-draining position 164. In some implementations, the fluid 134 may drain out of the tray 120 while it is in transit from the fluid-dispensing position 162 to the fluid-draining position or area 164, including while the tray is in the fluid-dispensing position 162 and in the fluid-draining position 164. In various implementations, there can be multiple dispensing and draining devices within a system.

In various embodiments, the trays 120 include drain holes (not shown in FIG. 1, see FIG. 3B), which allow the fluid 132, 134 to exit the trays 120. In some embodiments, the drain hole may be in the end of the tray and positioned a specific height or distance (e.g., between about 0.2 to about 5.0 cm) above the floor or bottom of the tray, so that the tray retains a specified depth of fluid. In other embodiments, the drain hole may be in the bottom of the tray and may be surrounded by a flange of a specific height. Thus, the fluid 132 that is added to the tray 120 at the fluid-dispensing position 162 may start draining 134 from the tray(s) 120B, 120C when the fluid reaches a level in the drain-end of the tray 120 that exceeds the drain hole's height.

In various implementations, the drain hole may be adjustable (e.g. with an adjustable and/or partially closable cover or the like) such that a tray can retain an adjustable quantity of liquid nutrient solution when tilted and when moving throughout the system 100. In some embodiments, the system 100 may include sensors and devices (not shown) that activate a drain or valve or the like of the tray 120C, which may work in conjunction with a drain hole (not shown) of the tray 120C, such that the fluid 134 can exit the tray 120C.

In various embodiments, the system 100 may orient the tray 120C, at least while in the fluid-draining area 164, such that the tray 120C longitudinally tilts or inclines toward the tray's drain hole and toward the fluid-collecting device 136 (i.e., tilts downward toward the right in the example shown in FIG. 1), and gravity assists in draining the fluid 134 from the tray 120C. In some embodiments, the system 100 may also longitudinally tilt the trays 120 to a level position or to a downward-away-from-the-drain-hole position to allow the liquid nutrient solution to flow toward the filling end of the trays 120 (i.e., the left end in FIG. 1), when the trays 120 are located in different areas or positions within the system 100, such as when the trays 120 are not in the bottom area of the system 100.

In some embodiments, the fluid-collecting device 136 may be fluidly connected to the fluid-dispensing device 130, such that drained fluid 134 may be reused by the fluid-dispensing device 130 for a different tray.

Although the example of FIG. 1 shows a fluid-dispensing position 162 and a fluid-draining position or area 164, in various embodiments, the fluid-dispensing position 162 and the fluid-draining position 164 could be the same position, or there could be multiple instances of each position.

As mentioned above, various embodiments of the system 100 may include a computer that controls any, several, or all aspects of the operation of the system 100, including the supplying of nutrient fluid 132. Computerized embodiments may be programmed and configured to grow a variety of plants using different fluids—as each type of plant needs different growing conditions, and the fluid supplying may be remotely monitored and altered.

The example of a system 100 shown in FIG. 1 uses a significant amount of vertical space while maintaining a small ground footprint. Because the plant-growing trays are held and maneuvered by a closed loop continuous chain 105, the system 100 can be configured for virtually any dimension (length, height, width) by positioning the sprockets 110 and routing the chain 105 appropriately. In various examples of embodiments, the system 100 may be from about 4-12 feet wide, 6-36 feet high, and 2-48 feet long, among other possibilities. For instance, the example of a configuration shown in FIG. 1 may be 8 feet wide, 12 feet tall, and 4 feet deep. This allows the system to utilize typically unused space within buildings, and especially unused vertical space. In various embodiments, the system may be expanded or contracted as needed when being installed, to accommodate a wide range of available space and a wide range of needed plant growing capacity.

One of ordinary skill will recognize that the components and implementation details of the system in FIG. 1 are examples presented for conciseness and clarity of explanation. Other components and implementation details may be used without departing from the principles of the invention. For one example, it should be noted that the positions of the fluid dispenser 130 on the left in FIG. 1 and the fluid-collecting device 136 and tray drain holes on the right of FIG. 1 could be reversed, such that the fluid dispenser 130 is on the right and the fluid-collecting device 136 and tray drain holes are on the left, and such a system 100 would be configured to longitudinally tilt the trays according to this particular example's configuration; e.g., tilt the trays 120 on the bottom run downward from right-to-left toward a left side drain hole to drain the fluid 134, etc.

Figure 2:
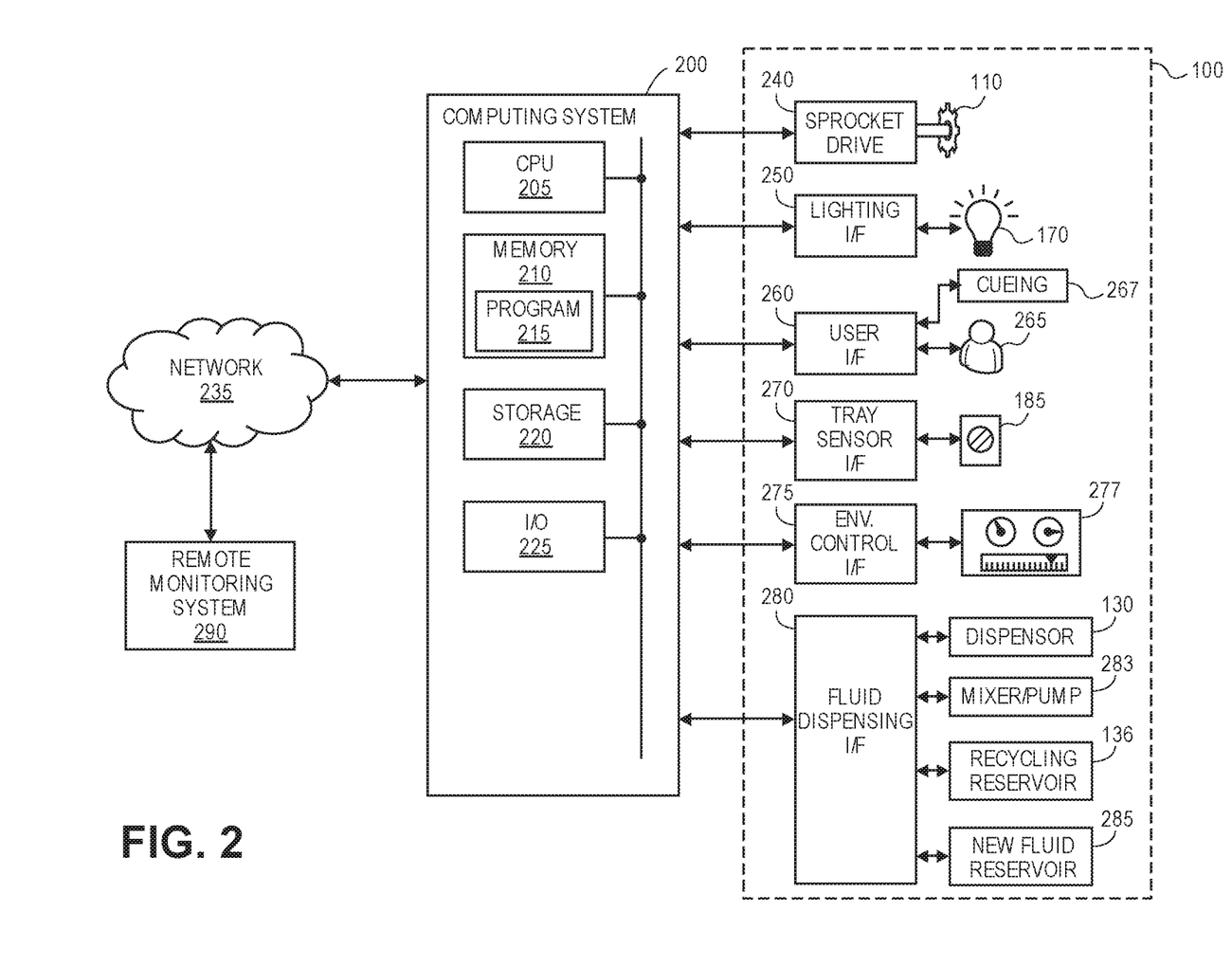
FIG. 2 is a block diagram of an example of a system for vertical hydroponic farming, consistent with various embodiments of the invention.

FIG. 2 is a block diagram of an example of a system for vertical hydroponic farming, consistent with various embodiments of the invention. In the example shown in FIG. 2, a computing system 200 is operably connected to a system 100 for vertical hydroponic farming, and the computing system 200 controls various functions and components of the system 100.

As shown, the computing system 200 is operably connected to a sprocket drive 240, which may be a device such as an electric motor(s) or the like, and controls the sprocket drive 240 to rotate one or more sprockets 110 of the system 100, and thus move the chains 105 and their attached trays 120.

The computing system 200 is also operably connected to a lighting interface 250, which may be part of or connected to the lights 170, and which controls the lights 170, for example by turning the lights 170 on or off, varying their intensity, changing or varying the wavelength of the light emitted, etc. In some implementations, the computing system 200 may send digital commands via the lighting interface 250 to change the light intensity and wavelengths produced by specific light(s) 170 based on the location and/or contents of specific trays in the system 100, so as to provide light that is most beneficial to the type of plants in the nearby trays and/or the stage of growth of the plants in the nearby trays.

The computing system 200 is also operably connected to a user interface 260, which may include a touch screen display that displays a graphical user interface (GUI); a monitor and a mouse and/or keyboard; switches or buttons; and/or a speaker and a microphone. A user 265 may interact with the user interface 260 to control the system 100 via the computer 200, to receive instructions from the computing system 200 or systems connected to the network 235, to enter data and/or commands into the computing system 200, and the like. For example, the user 265 may request via the user interface 260 that a specific tray be brought to the work position 160, and the computing system 200 will process the request and activate the sprocket drive until that specific tray is located at the work position 160, according to data from the sensor 185A. The user 265 may enter the request into the computing system 200 by, for example, pressing GUI buttons or by speaking into a microphone, where the computing system 200 performs speech recognition to discern the user's request or command, and then causes action in the system 100 according to the request or command.

In some embodiments, the user interface 260 may be or include or be operably connected to a cueing device or subsystem 267, which may be or include a handheld device, earpiece, or garment that is used or worn by the user 265, and which may provide non-verbal communication with the user 265 through speech synthesis, vibrations or pulses or the like. An example of such an embodiment is further described below, after Table 1.

The computing system 200 is also operably connected to an environment control interface 275, which may be part of or connected to the environment controls 277 for the building or enclosure that contains the system 100 for vertical hydroponic farming. In various implementations the environment controls 277 may control, change, or affect the characteristics of the air, lights, windows, etc. of the building that contains the system 100. In various implementations, the computing system 200 may send digital commands to and receive environmental digital data from the environment controls 277 via the environment control interface 275. For example with respect to the air in the building, the commands may change or affect the characteristics of the air in the building, such as the air temperature, the air movement (ventilation), the air humidity, the carbon dioxide level in the air, and the like. In some implementations, the computing system 200 may change the air characteristics based on the plants in the trays 120 of the system 100, so as to provide air that is most beneficial to the type of plants in the trays and/or to the stage of growth of the plants in the trays.

The computing system 200 is also operably connected to a fluid dispensing interface 280, which may be part of or connected to the fluid-dispensing device 130, a mixer/pump 283, a fluid-collecting device or recycling reservoir 136, and a new fluid reservoir 285. In various implementations, the fluid-collecting device/recycling reservoir 136 may be a tank, a container, or the like (and its associated plumbing) that holds the fluid 134 that drains out of the trays 120; the new fluid reservoir 285 may be a tank(s) or container(s) or the like that holds new or unused nutrient fluid(s), which may include various type of fluids that contain various types of nutrients which may be combined differently for different plants; and the mixer 283 may be a mixing device with an electric pump(s), or simply an electric pump(s), or the like, that combines or mixes or samples fluids from the fluid-collecting device/recycling reservoir 136 and/or from one or more new fluid reservoir(s) 285 for dispensing via the fluid-dispensing device 130. In some implementations, there may be only a single reservoir 136 and a single pump 283.

The fluid dispensing interface 280 enables the computing system 200 to control the reservoirs 136, 285, the mixer 283, and the dispenser 130 to place the fluid 132 into the tray 120B that is in the fluid-dispensing position 162. In some implementations, the computing system may change or customize the composition of the fluid 132 that is dispensed into the tray 120B based on the location and/or contents of the tray 120B, so as to provide nutrient fluid that is most beneficial to the type of plants in the tray and/or the stage of growth of the plants in the tray. In various embodiments, the nutrient solutions may be monitored automatically and the chemistry, PH, etc., may be adjusted as needed, e.g., by the computing system 200 or by a person acting on directions providing by the computing system 200. In various embodiments, the nutrient fluid 132 is sterilized in a sterilizer or tank (not shown) between the reservoirs 136, 285, the mixer 283, the dispenser 130 and the tray 120, for example by irradiation using ultraviolet light or by other means known to reduce or eliminate bacteria from fluid media.

The computing system 200 is also operably connected to a tray sensor interface 270, which may be part of or connected to the sensor(s) 185. A sensor 185 may detect and signal, via the tray sensor interface 270, to the computing system 200 when a tray 120 occupies the sensor's detection position, such as the work position 160; the fluid-dispensing position 162; and/or the fluid-draining position 164. In some embodiments, a sensor 185 may additionally or alternatively detect and signal, via the tray sensor interface 270, to the computing system 200, the identity of the tray 120 that it has detected, where the identity may be determined by a unique number or the like encoded in a barcode, RFID tag, or the like 180 that is on the detected tray 120.

The computing system 200 may use the data from the tray sensor interface 270 and sensor(s) 185 to assist with various functions and operations, such as: activating and deactivating the sprocket drive 240 to move a user-specified tray to a specified position, (e.g., to the work position 160); changing the intensity and/or wavelength emitted by the lights 170 after a specific tray(s) is positioned near the lights 170; activating and deactivating the fluid dispenser 130 and its associated devices to create and/or dispense a solution containing specific nutrients after a specific tray(s) is moved to the fluid-dispensing position 162; and the like. In some embodiments, sensors 185 at both sides (e.g., left and right) of the system 100 keep track of one or more trays 120 and the computing system 200 or a dedicated device may stop the roller chains 105 if one side lags behind the other. The computing system 200 may be programmed to stop and alert the user if the two sides of the tray subsystem (e.g. the two chains 105L and 105R) get out of alignment with each other.

In the example shown in FIG. 2, the computing system 200 includes a number of components, such as a central processing unit (CPU) 205, a memory 210, an input/output (I/O) device(s) 225, and a nonvolatile storage device 220. As shown, the components 205, 210, 220, and 225 connect and communicate through a local data bus. The I/O component(s) 225 may connect the computing system 200 to external devices 240, interfaces 250-280, networks 235, and the like through a direct communication link (e.g., a hardwired or local wifi connection), through a network, such as a local area network (LAN) or a wide area network (WAN, such as a cellular telephone network or the Internet), and/or through other suitable connections. System 200 may be standalone or it may be a subsystem of a larger system.

The CPU 205 may be one or more known processor or processing devices, such as a microprocessor from the Core™ family manufactured by the Intel™ Corporation of Santa Clara, Calif. or a microprocessor from the A10™ family manufactured by the AMD™ Corporation of Sunnyvale, Calif. The memory 210 may be one or more fast storage devices (e.g., solid state RAM device) configured to store instructions and information executed or used by the CPU 205 to perform certain functions, methods, and processes related to implementations of the present invention. The storage 220 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 210 contains one or more programs or applications 215, which may be loaded from the storage 220 or from a remote system (not shown), and that, when executed by the CPU 205, perform various operations, procedures, processes, or methods consistent with the present invention. Alternatively, the CPU 205 may execute one or more programs located remotely from the system 200. For example, the system 200 may access one or more remote programs via the network 235 that, when executed, perform functions and processes related to implementations of the present invention.

In one implementation, the memory 210 may include a program(s) 215 for performing the specialized functions and operations described herein with respect to the system 100. In some implementations, the memory 210 may also include other programs or applications that implement other methods and processes that provide ancillary functionality to the invention.

The memory 210 may be also be configured with other programs (not shown) unrelated to the invention and/or an operating system (not shown) that performs several functions well known in the art when executed by the CPU 205. By way of example, the operating system may be Microsoft Windows™, Unix™, Linux™, an Apple Computers™ operating system, or other operating system. The choice of operating system, and even to the use of an operating system, is not critical to the invention.

The I/O device(s) 225 may comprise one or more input/output devices that allow data to be received and/or transmitted by the system 200. For example, the I/O device 525 may include one or more input devices, such as a keyboard, touch screen, mouse, and the like, that enable data to be input from a user (e.g., the user 265). Further, the I/O device 225 may include one or more output devices, such as a display screen, a CRT monitor, an LCD monitor, a plasma display, a printer, speaker devices, and the like, that enable data to be output or presented to a user. The I/O device 225 may also include one or more digital and/or analog communication input/output devices that allow the computing system 200 to communicate, for example, digitally, with other machines and devices, such as the devices and interfaces 240-280 of the system 100. Other configurations and/or numbers of input and/or output devices may be incorporated in the I/O device 225.

In the implementation shown, the system 200 is connected to a network 235 (such as the Internet, a private network, a virtual private network, a cellular network or other network or combination of these), which may in turn be connected to various systems and computing machines (not shown), such as servers, personal computers, laptop computers, client devices, etc. In general, the system 200 may input data from external machines and devices and output data to external machines and devices via the network 235.

One of ordinary skill will recognize that the components and implementation details of the system in FIG. 2 are examples presented for conciseness and clarity of explanation. Other components and implementation details may be used. For example, the system 100 may include manual buttons and levers (not shown) which control various functions (e.g., emergency stop, moving the chains forward, moving the chains in reverse, dispensing fluid, etc.) in conjunction with or instead of the computing system 200.

FIG. 3A depicts a left side view (oriented from the perspective of the example shown in FIG. 1) of a tray 120 for hydroponic farming, and FIG. 3B depicts a right side view of the tray 120 for hydroponic farming, consistent with various embodiments of the invention.

As shown in this example, the ends 300, 350 of the tray 120 include a hook 305, which is used to attach the tray to the chains 105L and 105R. More particularly, in the implementation shown in FIGS. 3A, 3B, and 4, the trays 120 are hung by the hooks 305 onto studs or pins or the like that protrude from the chains 105L and 105R, which allows the trays 120 to swing and tilt freely.

In the implementation shown, both the left end 300 and the right end 350 of the tray 120 include a front bump cam 310 and a rear bump cam 320, where front and rear are oriented from the perspective of the example shown in FIG. 1. The bump cams 310, 320 cause the tray 120 to tilt toward the front or rear, as explained with respect to FIG. 4. Various implementations of the system 100 may be configured to tilt the trays frontward or rearward toward the lights 170. Some implementations of the trays 120 may not include bump cams 310, 320.

In some implementations, as shown, the left end 300 and/or the right end 350 of the tray 120 includes one or more magnets 330 in or attached to the outer surface of the end. In such implementations, the system 100 may employ a magnetic sensor 185 to detect the presence of a tray 120 at a specific position, such as the work position 160, or the like. In various embodiments, the magnetic sensor 185 may communicate the detection information and/or other information it collects to the computing system 200, which uses the information to control the operation of the system 100. The magnetic sensor(s) 185 may be attached to the frame of the system 100.

In some implementations, as shown, the left end 300 (as shown) and/or the right end 350 of the tray 120 includes one or more information-containing (e.g., identification containing) indicia 180, such as a barcode (as shown) or RFID tag or ID number or descriptive label or the like, on or attached to the outer surface of the left end 300 and/or the right end 350. In such implementations, the system 100 may employ an optical sensor 185A, such as a barcode reader or OCR reader, to detect the presence of a tray 120 at a specific position, such as the work position 160, or the like. In addition, an optical sensor 185 may gather or collect the information from the identification indicia 180, such as a number that uniquely identifies each tray in the system 100 and/or information describing the plants contained in the tray 120 and/or information describing the nutrient fluid that should be dispensed into the tray 120, and the like. In various embodiments, an optical sensor 185 may communicate the detection information and/or other information it collects to the computing system 200, which uses the information to control the operation of the system 100. The optical sensor(s) 185 may be attached to the frame of the system 100. In other embodiments, the optical sensors may be replaced by RFID sensors.

In various implementations, as shown, the right end 350 of the tray 120 includes a drain hole 360. As shown, the drain hole may be offset a specific height or distance above the bottom of the tray 120, so that the tray retains a depth of fluid 132 below the level of the drain hole 360. In some implementations, the drain hole 360 may include an adjustable cover or plug or the like (not shown) that partially covers a portion of the drain hole 360, which effectively allows the height of the drain hole 360 to be varied, so as to vary or adjust the depth of the fluid 132 that is retained in the tray 120.

In some embodiments, as shown in FIGS. 3A and 3B, the left end 300 and the right end 350 may be of different vertical lengths, such that each hook 305 is a different distance from the bottom of the tray 120 and such that the tray 120 tilts longitudinally when the hooks 305 at each end 300, 350 are hung on pins that are horizontally level with each other. Such embodiments raise the end 350 containing the drain hole 360 so as to cause the fluid 132 in the tray 120 to flow away from the drain hole 360, which prevents spilling the fluid 132 through the drain hole 360 when the tray 120 is moved out of the fluid-draining area 164.

In various embodiments, the difference in vertical lengths of the ends 300, 350 may be designed to impart a specific degree of longitudinal tilt or inclination to the tray 120, which in this example is right-to-left downward longitudinal tilt (from the perspective of the example of FIG. 1) away from the drain hole 360, such as between about −0.5 to −10 degrees of right-to-left downward longitudinal tilt with respect to horizontal; for example −2 degrees of right-to-left downward longitudinal tilt.

FIG. 4 shows a front perspective view of the left side of a tray 120 while installed in a system for vertical hydroponic farming, consistent with various embodiments of the invention. As shown in this example, the tray 120 includes a tray cover 170, which is described in more detail in FIG. 7. The left end 300 is hooked onto a bushing between washers 430, which are on a pin 420 of the chain 105. In various embodiments, as shown here, the pins 420 on the left chain 105L of the system (e.g., on the fluid-dispenser side of the system 100) may have smooth plastic bushings with washers at each end of each bushing, which act as spacers to keep the end 300 of the plant tray 120 a specific, invariable distance away from the chain 105L, such as from about 4 to 40 mm away from the chain 105L.

The right end 350 (not shown in FIG. 4) is similarly hooked onto a bushing of a pin 420 in the right-side chain 105R. In various embodiments, the tray pins on the right side of the system 100 are longer and do not include washers between the bushings (e.g., they are surrounded by a single bushing), which allows the hook 305 of the right end 350 of the tray 120 to slide slightly left and right when needed, such as when the tray is tilted longitudinally or when the width of the frame of the system 100 (e.g., the distance between the right side chain 105R and the left side chain 105L) varies slightly. In some implementations that employ hollow pin roller chains 105, the tray supporting pins 420 and their associated bushings, etc. may be inserted into any link of the chain 105, and may be moved to change the trays' attachment points to the chain 105.

The hook and pin arrangement allows the tray 120 to be easily removed from the system 100 and easily reattached to the chains 105, as needed.

The implementation shown in FIG. 4 also includes a cam activator 410, which in this example is a member that pushes against the rear bump cam 320 to tilt the tray 120 rearward. As shown, the cam activator 410 is attached to a member(s) 440 of the frame of the system 100 alongside or near the path of the chain 105, such that when the chain 105 moves the tray into the area of the cam activator 410, the rear bump cam 320 comes into contact with the cam activator 410, as shown. In various implementations, the cam activators 410 are located in areas of the chain path that cause the trays to tilt toward the lights 170 of the system 100. One of ordinary skill will recognize that the cam activators 410 may be placed on the other side of the chain 105 opposite what is shown in the example of FIG. 4, so as to contact the front bump cam 310 and cause the tray 120 to tilt frontward.

The size of the cams 310, 320 and/or the distance of the cam activators 410 from the chains 105 may be varied or different from what is shown in order to achieve a desired degree of front-to-back and back-to-front tilt, such as from about 5 to about 35 degrees of tilt from the horizontal. As noted previously, some embodiments of the system 100 may not include cams 310, 320 or cam activators 410.

Figure 5:
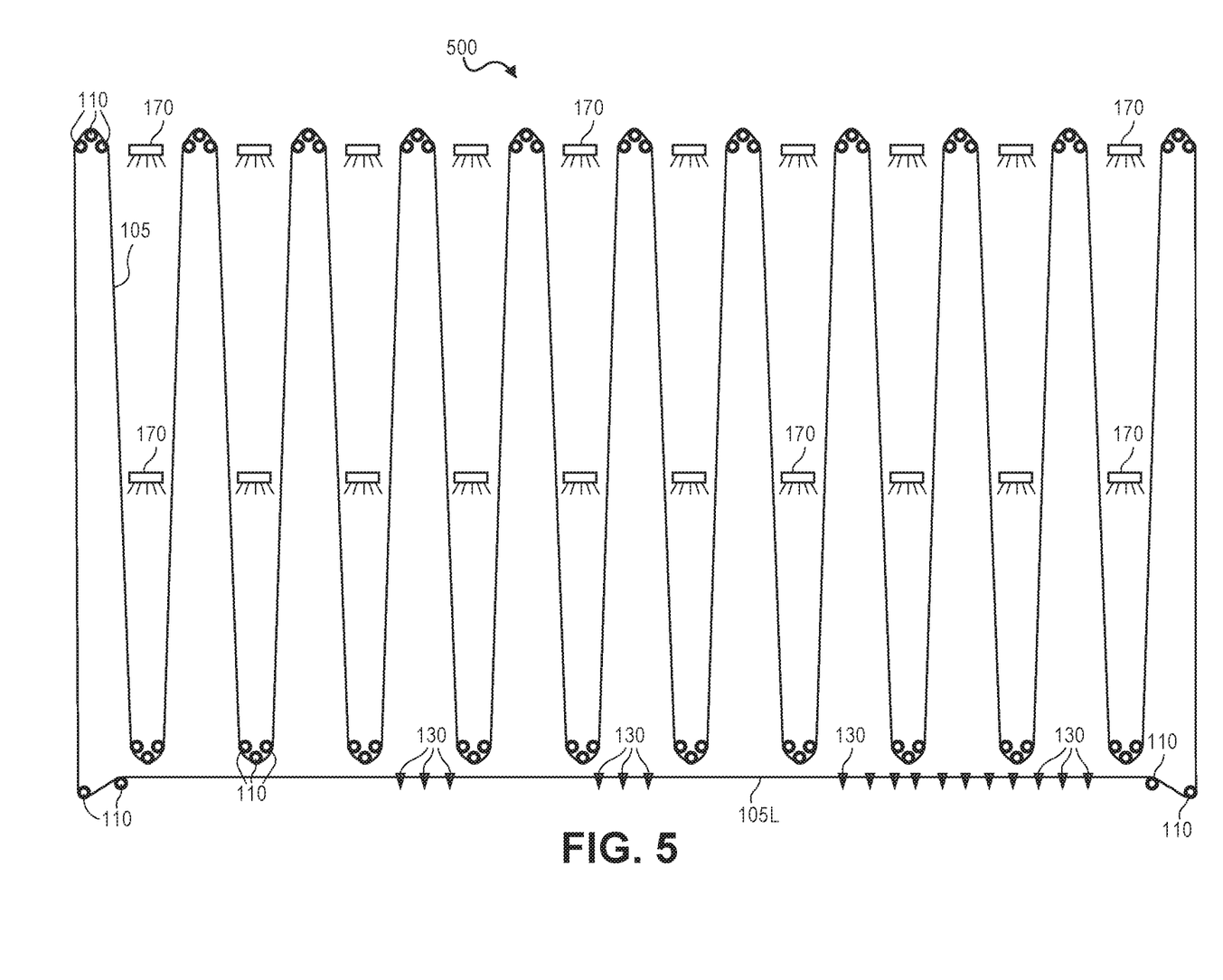
FIG. 5 depicts a left side view of an example of the arrangement of several components in a system for vertical hydroponic farming, consistent with various embodiments of the invention.

FIG. 5 depicts a left side view of an example of the arrangement of several components in a system 500 for vertical hydroponic farming, consistent with various embodiments of the invention. In this example of an implementation, the system 500 is a larger scale system (e.g., about 20 feet high and about 40 feet deep) that includes 10 "Vs" in the path of the chain 105L, and each V includes two lights 170, one of which is positioned at the top of the V and one of which is positioned about halfway down the V. Various embodiments may include additional lights 170 inside the Vs, for example as needed to best illuminate all plants in Vs that have a large height dimension; e.g. and additional light 170 for about every ten feet of height. In various embodiments, the lights may be LED lights, which are mounted or arranged in a rigid configuration and/or in a flexible string or rope configuration. In addition, the system 500 could be designed such that the vertical height can be different for different Vs in the system, in order to fit into available vertical space; for example the rear Vs could be 20 feet high, and the front Vs could be 12 feet high.

In this example, there are multiple fluid-dispensing device 130 along the bottom run of the left-side chain 105L, and the system 500 dispenses fluid to multiple trays 120 at the same time and/or dispenses different fluids serially to the same tray by moving the tray under one fluid-dispensing device 130 after another. In some embodiments, fluid can be dispensed at multiple places within the system. In some embodiments, the system may be programmed or operated to have a tray stop under two or more appropriate fluid-dispensing devices 130 to receive a desired mix of nutrient fluids 132.

Figure 6:
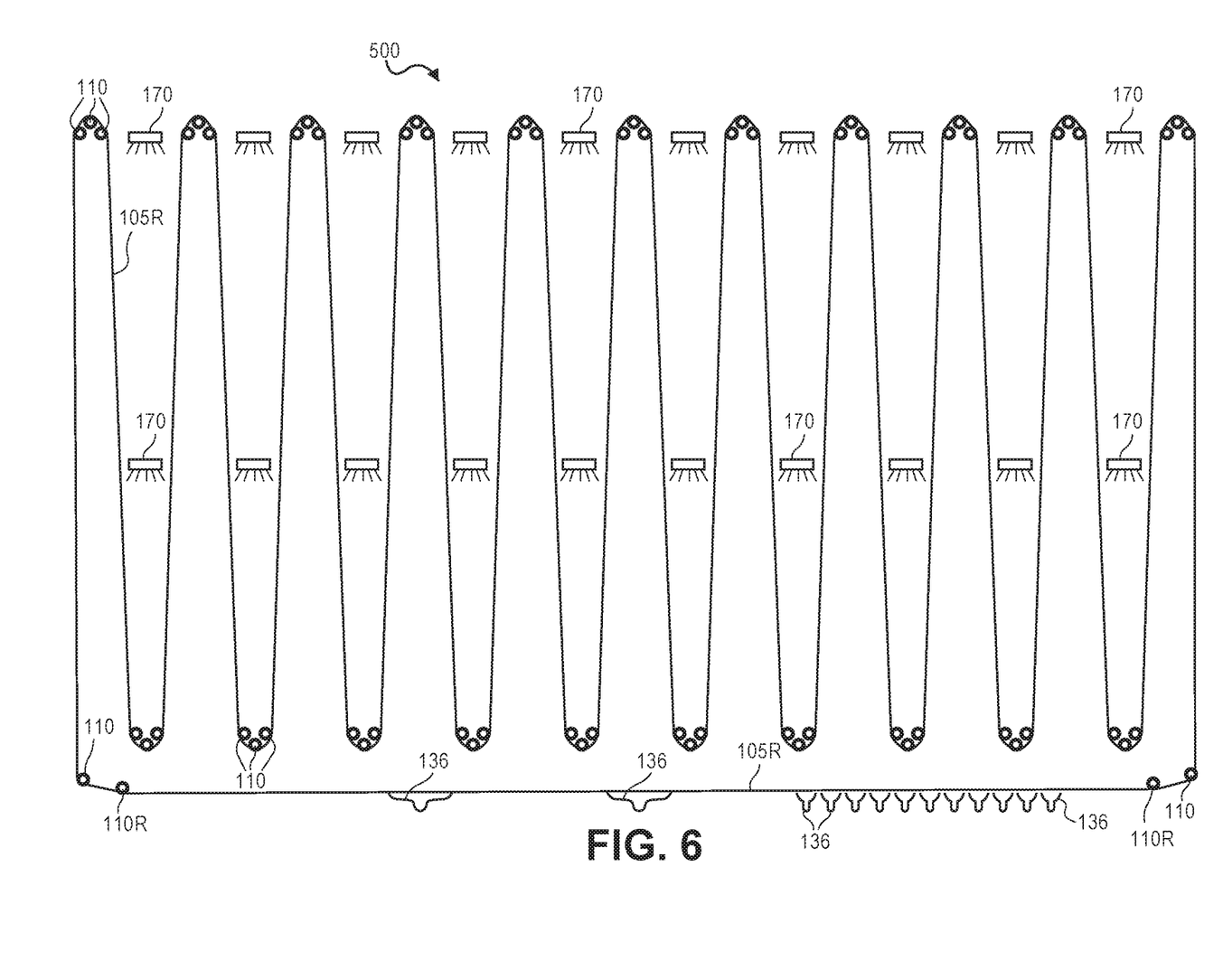
FIG. 6 depicts a right side view of an example of the arrangement of several components in the system for vertical hydroponic farming of FIG. 5, consistent with various embodiments of the invention.

FIG. 6 depicts a right side view of an example of the arrangement of several components in the system 500 for vertical hydroponic farming of FIG. 5, consistent with various embodiments of the invention. This view of the system 500 shows the multiple fluid-collecting devices 136 along the bottom run of the chain 105R, to catch the fluid 134 draining from multiple trays when the system 500 dispenses fluid to multiple trays 120, as described with respect to FIG. 6.

FIG. 6 also shows that the bottom run of the chain 105R is lower than or below the bottom run of the chain 105L shown in FIG. 5. In the example shown in FIG. 6, the bottom run of the chain 105R is lowered by the sprockets 110R. In other implementations, the bottom run of the chain 105R may be directed lower than the bottom run of the chain 105L by a chain guide or the like, e.g., as shown in the related provisional application.

The lower bottom run (e.g., between the sprockets 110R) of the right chain 105R compared to the bottom run of the left chain 105L (FIG. 5) causes the trays that occupy the bottom run to longitudinally tilt downward from the left to the right. This causes the fluid 132 in the trays 120 in the bottom run to flow toward the right end of the tray, where each tray's drain hole 360 is located, and then to flow out of the drain holes 360 and into the fluid-collecting devices 136. The difference in the vertical heights above the floor of the bottom run of the left chain 105L and the right chain 105R may be designed to impart a specific degree of longitudinal tilt or inclination to the trays 120 that are currently located along the bottom run, which in this example is left-to-right downward longitudinal tilt. For example, the difference may be such as to impart to the trays between about −1 to −10 degrees of left-to-right downward longitudinal tilt with respect to horizontal; such as −5 degrees of left-to-right downward longitudinal tilt.

In some implementations, the nutrient fluids collected by each of the fluid-collecting devices 136 may be directed to tanks where the chemistry is adjusted if needed, either under the control of the computing system 200 or manually, and the nutrient fluids are then reused.

The trays level out after leaving the bottom run of the system 500, which causes the fluid 132 to flow back toward the left and stand at a depth that is less than the height of the drain hole 360 above the bottom of the tray 120.

FIGS. 7A-7D depict various embodiments of tray covers. In various implementations, these tray covers may be made of a plastic material or a thin metal material, or the like, and may snap onto the trays 120. The covers provide support and stability to the plants, and especially to young or small plants. The covers also prevent light from shining on the roots of the plants, as such light may be detrimental to the plants. In some embodiments, a tray or trays 120 may not be covered.

Figure 7A:
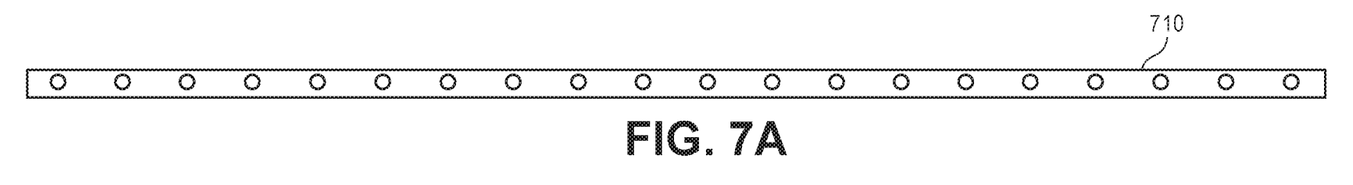
FIG. 7A depicts a top view of an example of a cover for a tray for hydroponic farming, consistent with various embodiments of the invention.

FIG. 7A depicts a top view of an example of a cover 710 for a tray 120 for hydroponic farming, consistent with various embodiments of the invention. In this example, the openings in the cover 710, depicted by the circles, are spaced at a distance of about 12 inches apart, to accommodate large plants or plants that will grow to a large size.

Figure 7B:
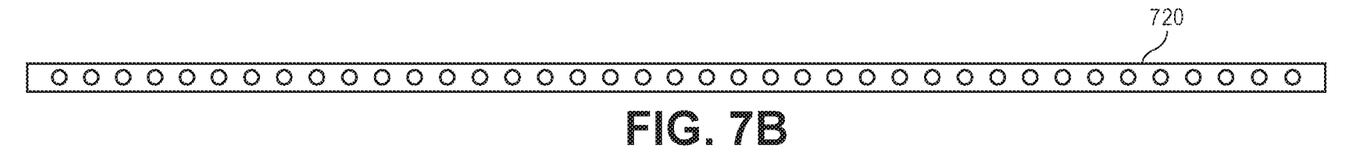
FIG. 7B depicts a top view of another example of a cover for a tray for hydroponic farming, consistent with various embodiments of the invention.

FIG. 7B depicts a top view of another example of a cover 720 for a tray for hydroponic farming, consistent with various embodiments of the invention. In this example, the openings in the cover 710, depicted by the circles, are spaced at a distance of about 6 inches apart, to accommodate small plants or plants that will grow to a small size.

Figure 7C:
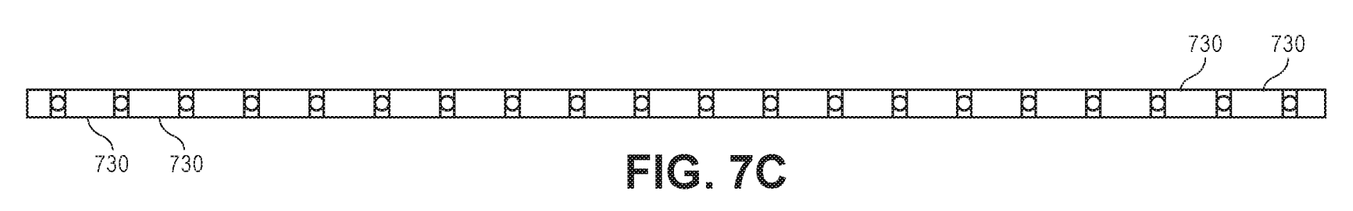
FIG. 7C depicts a top view of an example of covers for a tray for hydroponic farming, consistent with various embodiments of the invention.
Figure 7D:
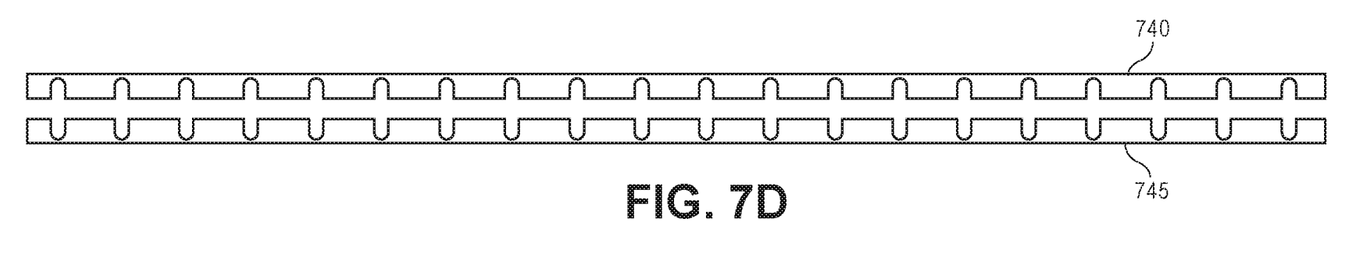
FIG. 7D depicts a top view of another example of a cover for a tray for hydroponic farming, consistent with various embodiments of the invention.

FIG. 7C depicts a top view of an example of covers 730 for a tray for hydroponic farming, consistent with various embodiments of the invention. In this example, the covers are small pieces 730, some of which are about 10-12 inches long and some of which are about 4-6 long. These pieces may be placed on the tray 120 with spaces between them (depicted by the circles) as needed to give custom amounts of room for each plant. A user 265 may remove one or more of the cover pieces 730 before harvesting (e.g., removing) the plants from the tray 120. Having one more cover pieces 730 removed makes harvesting easier and minimize or eliminates damage to the plants' roots, which can be cause by pulling the plants through holes in a cover FIG. 7D depicts a top view of an example of a two-piece cover 740, 745 for a tray for hydroponic farming, consistent with various embodiments of the invention. In this example, the cover is split longitudinally into two pieces 740 and 745, which makes it possible to remove one or both pieces before harvesting (e.g., removing) the plants from the tray 120. Having one piece 745 or both pieces 740 and 745 removed makes harvesting easier and minimize or eliminates damage to the plants' roots, which can be cause by pulling the plants through the holes in a cover.

As noted throughout this description, various embodiments of the system 100 may include features to accommodate and optimize the abilities of people with significant disabilities, such as, but not limited to, disabled veterans, autism, dementia, cerebral palsy, blindness, cognitive disorders, physical disabilities, PTSD, and mental illness. The system 100 may include features that reduce confusion, aid in accessibility, provide focus, reduce stress, and is easily customizable for various disability needs.

As explained with respect to the various embodiments and implementations described above, the system 100 moves the plants throughout the growing area and therefore is capable of bringing the growing trays to a convenient location for the user to perform planting, inspecting, harvesting, cleaning, etc. In various embodiments, the system incorporates sliding seats, specialized lighting, simple growing tray attachment features (e.g., hooks), audible outputs, and/or system controls that make accommodations for persons with wide ranging significant disabilities.

Table 1 shows examples of features and implementations for various embodiments that accommodate various disabilities.

TABLE 1

| Disability | Examples of System Features |
|---|---|
| Physical disabilities | Sliding seat, easy to reach components, adjustable height workstation, location guides, modifiable for custom accommodations. |
| Blindness | Uniform placement of trays/produce, Audible outputs, consistent task sequencing, voice command/speech recognition |
| Cognitive disorders | Simplified tasks, audible outputs, task prompting |
| Dementia | Simplified tasks, audible outputs, task prompting |
| Cerebral Palsy | Sliding seat, easy to reach components, adjustable height workstation, guides, modifiable for custom accommodations. |
| PTSD | Customizable work setting and health monitoring (sound, lighting, heart rate, blood pressure, co-worker interaction, etc.). Can provide isolated or group interaction tasks depending on need. |
| Disabled Veterans | Custom modified as per above |
| Autism | See physical disabilities, PTSD, and cognitive disabilities |

Some embodiments of the system 100 may include means for a user 265 to receive cues, such as visual, audio, or sensory cues, work instructions, and the like, for example, cues or instructions to perform plant-growing or system maintenance tasks. The user may be cued (e.g., guided) through tasks, sequences, reminders, or prompts via a cueing subsystem 267, which may be or include a handheld device, an earpiece, and/or a garment capable of non-verbal communication through vibrations or pulses. In some implementations, the handheld device, earpiece, or garment may be or connect via one of the user interface apparatuses 260 that is operably connected to the system 100, e.g., via wi-fi user interface 260. These cues are designed to enhance productivity and expand employee job choices for users 265 with disabilities through one or more inputs, such as pre-programmed work flow cues, interactive work flow cues, and real-time work flow cues, which may come from a remote monitoring or on-site supervisor system 290 and/or from the computing system 200. The cueing subsystem or device 267 will provide cues such as information on tasks, sequencing, and/or quality checks. The quantity and quality of cues may vary according to the ability of the user 265, including factors such as the amount of training and familiarity the user 265 has with the tasks, the user 265's level and type of cognition, the user 265's level of sensory ability and processing and other parameters as appropriate.

In various embodiments, a supervisor, e.g., using the remote monitoring system 290, will provide cues through the cueing subsystem or device 267 to manage the workflow of the user 265, including some or all of orchestration, dispatch, and anomaly correction for ongoing work. In some embodiments, a supervisor interface of the remote monitoring system 290 will also track individual and task completion progress in real time, measuring individual progress towards goals and dispatching tasks as appropriate.

Some embodiments of the system 100 may include a transparent surrounding enclosure, and such embodiments can be located outside of a building or otherwise built to utilize available natural light (sunlight), which is supplemented with system lighting 170 (e.g., LED lighting) when needed. Such embodiments provide a hybrid system that allows for maximizing available sunlight and enhancing with artificial light as required.

Various embodiments of the hydroponic vertical plant-growing system 100 may incorporate computer programs, sensors, and autonomous controls to simplify the responsibilities and safety of the farmer or user. As previously noted, in various implementations, growing trays can be easily added, moved, removed, and adjusted (e.g., without the use of tools) to make planting, growing, harvesting, tray cleaning, and system maintenance fast, easy, and efficient. Some computerized implementations may include remote monitoring and control, (e.g., communications generated and sent via a remote monitoring system 290), combined with autonomous visual and audible signals, e.g., generated and sent by the computing system 200 via the user interface 260, that provide guidance to disabled users and/or inexperienced users, such as trainees. Various embodiments of the system 100 may also include physical guides, such as elbow rests and tray-holding tables or workstations, for ergonomic reasons and for simplification of various farming tasks throughout germination, growing, harvesting, and packaging.

Some embodiments of the hydroponic vertical plant-growing system 100 may include a controllable environment, e.g., a room or a warehouse or the like, that includes automatic and programmable controls, e.g., using the computing system 200, for temperature, humidity, air circulation, air gas composition, pest control measures, lighting, etc. In addition, various embodiments of the system 100 may include automatic and programmable controls, e.g., using the computing system 200, for lighting, liquid nutrient refreshment, liquid nutrient composition, liquid nutrient amounts, and tray rotation. This allows for customizing the growing conditions for a wide range of plant varieties.

As noted previously, in some embodiments, the growing trays 120 may be coded to indicate their contents and other information and the coding may be detected automatically by the system (e.g., via barcode readers or RFID tag readers) such that the computing system 200 can customize the treatment of each growing tray, for example, with respect to the contents of the liquid nutrient solutions. This allows for several different varieties of plants (each with their own unique liquid nutrient requirements) to be grown in the vertical hydroponics system simultaneously. Similarly, the light levels and wavelengths are adjustable and programmable, e.g., using the computing system 200, to optimize growing conditions for various plants.

Variations of the system described with respect to FIGS. 1-7 may include additional features to accommodate people with disabilities. Examples of such features include: a wearable coach device 267, which is a type of cueing device 267, that provides audible, sensory, and/or visual task prompting, which device is another example of, or is connected via, a user interface 260; easy to reach components, such as manual controls and/or computer interfaces (e.g., touchscreen monitors); work positioning location guides, e.g., on a workstation surface or attached to the frame of the system 100; speech recognition command and control; customizable work setting and health monitoring (e.g., sound, lighting, heart rate, blood pressure, co-worker interaction, etc.); and customized worker tasks presented by the user interface 260 and/or the cueing device 267 according to a computer program 215 and/or operator commands from the remote monitoring system 290, which provide isolated or group interaction, depending on the need and/or disability of the user.

Variations of the system described with respect to FIGS. 1-7 may include one or more additional features to increase automation and autonomy of the system. Examples of such features include: computer programming for timing automation such that lighting, watering, and farming interaction can occur at programmed intervals, with or without human intervention; computer programming for nutrient control automation such that multiple nutrient solutions can be monitored and adjusted by the addition of chemicals, water, pumping volume, etc.; computer programming for networking, e.g., via the network 235, to enable remote data monitoring and system control based on sensor data; and computer-interfaced imaging equipment to allow live photos and/or video feeds.

One of ordinary skill will recognize that the components, processes, data, operations, and implementation details shown in the figures are examples presented for conciseness and clarity of explanation. Other components, processes, implementation details, and variations may be used without departing from the principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A system for vertical hydroponic plant growing, the system comprising:
    a plurality of sprockets including:
        a first set of sprockets, and
        a second set of sprockets positioned opposite the first set of sprockets;
    a sprocket drive device that is connected to at least one sprocket of the plurality of sprockets;
    a first continuous loop chain that is mounted on the first set of sprockets of the plurality of sprockets;
    a second continuous loop chain that is mounted on the second set of sprockets of the plurality of sprockets;
    a plurality of trays, each tray of the plurality of trays includes a first end and a second end, formed opposite the first end, that includes a drain hole,
    wherein the first end of each tray of the plurality of trays is attached to the first continuous loop chain and the second end of each tray of the plurality of trays is attached to the second continuous loop chain; and
    a fluid-dispensing device that is configured to dispense a fluid into a tray among the plurality of trays that is moved by the first continuous loop chain and the second continuous loop chain to a position adjacent to the fluid-dispensing device;
    wherein the first set of sprockets includes at least one sprocket that defines a bottom run of the first continuous loop chain and the second set of sprockets includes at least one sprocket that defines a bottom run of the second continuous loop chain, the at least one sprocket of the second set of sprockets positioned below the at least one sprocket of the first set of sprockets, and
    wherein the at least one sprocket of the second set of sprockets positioned below the at least one sprocket of the first set of sprockets longitudinally tilts each tray downward towards the drain hole while the tray is near the position adjacent to the fluid-dispensing device, at the bottom run of the first continuous loop chain and the second continuous loop chain, and
    the first continuous chain loop and the second continuous chain loop readjust the longitudinal tilt of each tray to a level position when each tray is positioned opposite the bottom run of the first continuous loop chain and the second continuous loop chain.

2. The system for vertical hydroponic plant growing of claim 1, wherein the first continuous loop chain is configured to longitudinally tilt the tray downward towards the drain hole while the tray is near the position adjacent to the fluid-dispensing device.

3. The system for vertical hydroponic plant growing of claim 1, further comprising:
    a plant-growing light that is mounted between the first continuous loop chain and the second continuous loop chain.

4. The system for vertical hydroponic plant growing of claim 3, further comprising:
    a computing system;
    wherein the computing system is operably connected to the plant-growing light and controls the plant-growing light.

5. The system for vertical hydroponic plant growing of claim 1, further comprising:
    a sensor that is configured to detect that a tray occupies a specific position in the system.

6. The system for vertical hydroponic plant growing of claim 5, wherein the sensor is configured to detect that the tray occupies the position adjacent to the fluid-dispensing device.

7. The system for vertical hydroponic plant growing of claim 5, wherein data from the sensor is used to control the sprocket drive device.

8. The system for vertical hydroponic plant growing of claim 5, wherein the first end of each tray of the plurality of trays includes an information-containing indicia; and
    wherein the sensor is configured to read data from the information-containing indicia.

9. The system for vertical hydroponic plant growing of claim 8, wherein the data that is read from the information-containing indicia by the sensor is used to control the system.

10. The system for vertical hydroponic plant growing of claim 9, wherein the data read by the sensor is used to control the sprocket drive device.

11. The system for vertical hydroponic plant growing of claim 1, wherein the plurality of sprockets are arranged such that the plurality of trays pass through a work position that is located between about 2 feet to about 4 feet in height above a floor.

12. The system for vertical hydroponic plant growing of claim 11, further comprising:
    a sensor that is configured to detect that a tray occupies the work position.

13. The system for vertical hydroponic plant growing of claim 1, further comprising:
    a fluid-collecting device that is configured to collect the fluid that drains from the drain hole of a tray.

14. The system for vertical hydroponic plant growing of claim 13, wherein the fluid-collecting device is operably connected to the fluid-dispensing device, such that the fluid that drains from the drain hole of a tray is dispensed from the fluid-collecting device.

15. The system for vertical hydroponic plant growing of claim 1, further comprising:
    a cam activator that is adjacent to the first continuous loop chain; and
    wherein the first end of the tray further comprises at least one bump cam that contacts the cam activator and tilts the tray.

16. The system for vertical hydroponic plant growing of claim 1, further comprising:
   a plurality of pins attached to the first continuous loop chain and to the second continuous loop chain; and
   wherein the first end comprises a first hook and the second end comprises a second hook; and
   wherein the plurality of trays are attached to the first continuous loop chain and to the second continuous loop chain via the first hook and the second hook.

17. The system for vertical hydroponic plant growing of claim 16, wherein the first end is configured such that the first hook is a different distance from a bottom of the tray than the second hook.

18. The system for vertical hydroponic plant growing of claim 1, further comprising:
   a computing system;
   wherein the computing system is operably connected to the sprocket drive device and controls the sprocket drive device.

19. The system for vertical hydroponic plant growing of claim 18, wherein the computing system is operably connected to the fluid-dispensing device and controls the fluid-dispensing device.

20. The system for vertical hydroponic plant growing of claim 1, further comprising:
   a cueing device that provides audible, sensory, or visual task prompting to a user of the system.

* * * * *